(12) United States Patent
Fortmann (10) Patent No.: US 7,528,496 B2
(45) Date of Patent: May 5, 2009

(54) METHOD FOR OPERATING OR CONTROLLING A WIND TURBINE AND METHOD FOR PROVIDING PRIMARY CONTROL POWER BY MEANS OF WIND TURBINES

(75) Inventor: Jens Fortmann, Berlin (DE)

(73) Assignee: REpower Systems AG, Hamburg (DE)

( * ) Notice: Subject to any disclaimer, the term of this patent is extended or adjusted under 35 U.S.C. 154(b) by 106 days.

(21) Appl. No.: 10/570,196

(22) PCT Filed: Sep. 3, 2004

(86) PCT No.: PCT/EP2004/009808

§ 371 (c)(1),
(2), (4) Date: Nov. 20, 2006

(87) PCT Pub. No.: WO2005/025026

PCT Pub. Date: Mar. 17, 2005

(65) Prior Publication Data

US 2007/0085343 A1    Apr. 19, 2007

(30) Foreign Application Priority Data

Sep. 3, 2003 (DE) ............................... 103 41 057
Sep. 5, 2003 (DE) ............................... 103 41 504

(51) Int. Cl.
*H02P 9/00* (2006.01)
(52) U.S. Cl. ......................................... 290/44; 322/44
(58) Field of Classification Search .................... 290/44
See application file for complete search history.

(56) References Cited

U.S. PATENT DOCUMENTS 2,360,791 A * 10/1944 Putnam ........................ 416/37

4,427,897 A * 1/1984 Migliori ....................... 290/44
4,511,807 A * 4/1985 Somerville ................... 290/44

(Continued)

FOREIGN PATENT DOCUMENTS

DE    19756777 A1    7/1999

(Continued)

OTHER PUBLICATIONS

Christiansen, P. et al. "Grid Connection and Remote Control for the Horns Rev 150 MW Offshore Wind Farm in Denmark," Mar. 2001, pp. 1-11, XP002254252.

(Continued)

*Primary Examiner*—Joseph Waks
(74) *Attorney, Agent, or Firm*—Morrison & Foerster LLP (57) ABSTRACT

A method for operating at least one wind turbine with a rotor and an electric generator coupled to the rotor for delivering electrical power into an energy distribution system with the aid of a control device ensures that the wind turbine operates within its operating range. The wind turbine is controlled in response to the change of a system operating parameter and for a period of time, in such a manner that a higher power is fed into the system than belongs to the operating range of the steady-state operation. The same conditions also apply to a method for providing control power or primary control power for an electric energy generator and distributor system to which a multiplicity of power stations including wind turbines is connected, and to a wind turbine.

9 Claims, 3 Drawing Sheets

U.S. PATENT DOCUMENTS

| | | | |
|---|---|---|---|
| 4,695,736 A | | 9/1987 | Doman et al. |
| 4,906,060 A | * | 3/1990 | Claude .................. 322/29 |
| 5,155,375 A | * | 10/1992 | Holley .................. 290/44 |
| 5,225,712 A | * | 7/1993 | Erdman .................. 290/44 |
| 5,369,353 A | * | 11/1994 | Erdman .................. 323/207 |
| 6,137,187 A | * | 10/2000 | Mikhail et al. ............ 290/44 |
| 6,252,753 B1 | | 6/2001 | Bhargava |
| 6,670,721 B2 | * | 12/2003 | Lof et al. ................. 290/44 |
| 6,858,953 B2 | * | 2/2005 | Stahlkopf ................ 290/44 |
| 6,891,281 B2 | * | 5/2005 | Wobben .................. 290/44 |
| 6,965,174 B2 | * | 11/2005 | Wobben .................. 290/44 |
| 7,071,578 B1 | * | 7/2006 | Shibata et al. ............ 290/55 |
| 7,071,579 B2 | * | 7/2006 | Erdman et al. ............ 290/55 |
| 7,321,221 B2 | * | 1/2008 | Bucker et al. ............. 322/44 |
| 7,432,686 B2 | * | 10/2008 | Erdman et al. ............ 322/44 |
| 2004/0145188 A1 | * | 7/2004 | Janssen et al. ............ 290/44 |
| 2004/0207206 A1 | * | 10/2004 | Wobben .................. 290/44 |
| 2007/0052244 A1 | * | 3/2007 | Hudson .................. 290/44 |
| 2008/0150282 A1 | * | 6/2008 | Rebsdorf et al. ........... 290/44 |

FOREIGN PATENT DOCUMENTS

| | | |
|---|---|---|
| DE | 10022974 A1 | 11/2001 |
| EP | 0244341 A1 | 11/1987 |
| EP | 0569556 B1 | 12/1998 |

OTHER PUBLICATIONS

Heier, S. "Windkraftenlagen im Netzbetrieb," B. G. Teubner, Stuttgart, 1996, XP002310439.

Kontogiannis, C. C. et al. "An Efficient Power Management and Control in Wind Parks by Means of a Radio Telemetry Control System," *Electromotion*, Mediamira, Cluj-Napoca, RO, Jun. 19, 2001, pp. 461-465, XP001154444.

Svensson, J. et al. "Wind Farm Control Software Structure," International Workshop on Transmission Networks for Offshore Windfarms, Apr. 2002, pp. 1-15, XP002254250.

International Search Report issued on Jan. 7, 2005, for PCT patent application No. PCT/EP2004/009808 filed on Sep. 3, 2004, 5 pages.

Primarregelung mit Windkraftanlagen, Dr. Fred Prillwitz et al., Universitat Rostock, Feb. 2003.

Netzregelverhalten von Windkraftanlagen, A. Holst et al., VDI/VDE: Mai 6, 2003 Munchen.

\* cited by examiner

METHOD FOR OPERATING OR CONTROLLING A WIND TURBINE AND METHOD FOR PROVIDING PRIMARY CONTROL POWER BY MEANS OF WIND TURBINES

REFERENCE TO RELATED APPLICATIONS

This application is a national stage filing under 35 USC 371 of International Application No. PCT/EP2004/009808, filed Sep. 3, 2004, which claims Convention priority from German Patent Application Nos. 103 41 057.0 and 103 41 504.1, filed Sep. 3, 2003 and Sep. 5, 2003, respectively, the full disclosures of all of which are incorporated herein by reference.

FIELD OF THE INVENTION

The invention relates to methods for operating at least one wind turbine with a rotor, an electric generator coupled to the rotor, for delivering electrical power into an energy distribution system with the aid of a control device.

The invention also relates to a method for providing control power or primary control power for an electric energy generator and distributor system, to which a multiplicity of power stations including wind turbines, and loads are connected.

The invention also relates to a method for controlling a wind turbine having at least one drive train comprising a rotor and a generator and a control device, the wind turbine having a minimum rotational speed for system feed-in dependent on the type of construction.

Finally, the invention also relates to wind turbines.

BACKGROUND OF THE INVENTION

Changes in the active-power delivery of an energy generator as are normal with wind turbines lead to changes in the power system frequency in an energy distribution system if it cannot be ensured by controlling other power stations that as much energy is fed into the power system as is consumed by the connected loads. Due to the increase in proportion of wind turbines in the energy distribution system, the costs for compensating for the fluctuations of the feed-in power caused by wind power are rising for the power system operators.

A method for operating a wind turbine with an electric generator, which can be driven by a rotor, for delivering electric power to an electric power system are known (DE 100 22 974 A1). In this method, the power delivered by the generator to the power system is controlled or adjusted in dependence on the power system frequency of the electrical power system, the delivered power being decreased with a rise in the power system frequency. However, this is not a matter of providing control power and the measures proposed would also be unsuitable for this purpose.

In the normal operation of a power system without wind turbines, the adjustment does not present problems since only the load or the power consumed changes. However, the required control processes must be managed even in a power system with conventional power stations and with wind turbines. The situation is quite different when unpredictable incidents occur in a mixed power system with wind turbines, that is to say, for instance, a power failure or a voltage dip as a consequence of a ground fault or short circuit. The way they have hitherto been operated, wind turbines cannot provide any additional power in this case as can be done by conventional power stations in order to reduce in this way the primary control requirement of the power system operator. However, the wind turbine could be operated in a throttled manner, that is to say with a power which is below that which could be delivered by the wind turbine if it were set optimally to the existing wind conditions. However, this would have to be done whilst continuously taking into consideration the changing system conditions, locally and internationally, and in accordance with the requirements of the system operators but also with the wind conditions which are anything else but constant or even sufficiently accurately predictable.

In the case of an incident in the power system, for example, the primary control power must be rapidly activated in order to be able to counteract the decrease in frequency initiated by an incident before the frequency has dropped to a critical value. Apart from the fast activation, sufficient reserve power must also be kept available. In thermal power stations, the primary control power is kept available by throttling down the turbine inlet valves, the system operator ensuring that the throttling is only limited in time and that the existing secondary control power can replace the primary control power in time. From the point of view of energy, such slight throttling does not represent a loss since less fuel is consumed which is then available at a later time.

In a wind turbine, a control margin could also be provided by such "slight throttling" of the wind turbine so that the wind turbine is operated with a lower power than would be permitted by the wind conditions. Considered from the point of view of energy, however, this means that the available wind energy is not utilized when it would be possible, i.e. the wind passes the wind turbine unused in this operating mode.

Thus, this slight throttling of a wind turbine is a very costly measure since the unused part of the energy of the wind is not stored. In the case of a gas turbine, in contrast, primary energy is retained in slight-throttling mode and can be used at a later time.

In fact, the conditions in such mixed energy distribution systems are such that the wind turbines with their converter-fed systems do not contribute anything to the system stability and mass inertia of the power system when operating conventionally. Even if wind turbines with converters were to be operated with constant power at the power system this would even lead to an increase in the necessary control requirement which would have to be compensated for with conventional power stations with their primary control power.

SUMMARY OF THE INVENTION

By means of the present invention, a power system with conventional power stations and wind turbines or one wind turbine, respectively, is to be operated in such a manner that the wind turbine provides primary control power and, in particular, the wind turbine is to be used for providing control power.

A method for operating at least one wind turbine according to the invention relates to a wind turbine having at least one rotor with rotor blades, a generator feeding into an energy distribution system and a control device which controls the power feed-in in accordance with the operating conditions and is characterized by the fact that the control device significantly increases the power delivery into the power system for a period of time in dependence on the changes of a parameter of the power system in that a part of the kinetic energy of the rotating parts (of the drive train) is additionally utilized for the feed-in.

Such a parameter can also be the rotational speed, the power and the pitch of the rotor blades. A wind turbine which can operate in accordance with this method according to the invention is operated in a certain operating range. This is understood to be the parameters belonging to the current operating conditions such as, e.g. the rotational speed, the power and the pitch angle. The term operating range is used and not operating point since the external conditions for a wind turbine are subject to continuous fluctuations and thus require a so-called dynamic control system.

If an operating parameter, e.g. the system frequency, changes by a particular predetermined value within a particular period of time, this is a criterion, according to the invention, for operating the wind turbine or a number of wind turbines in such a manner that it feeds or they feed an excess of power into the power system independently of whether the associated or required wind energy is available at all at this time.

Only as an example and not as a restriction, a wind turbine with 1.5 MW power will be specified here in which approximately 11% of the nominal power can be additionally fed in for 10 s or approximately 100% of the nominal power can be additionally fed in for 1 s when the rotational speed drops from 1800 rpm to 1600 rpm.

According to the invention, such a change in system operation is detected and from this a signal is generated which is used for open-or closed-loop control purposes at the wind turbine or turbines.

According to the invention, changes in the operating parameters can be detected at any point in the power system and the signal derived therefrom can also be used distally depending on the conditions and the characteristics of the power system and also with regard to the characteristics of the individual wind turbines, namely being able to provide more or less control power. According to the invention, it would be possible to proceed in this case in such a manner that a central system computer calculates the signals in such a manner that the individual wind turbines are used differently for feeding-in control power in order to operate the power system as a whole in optimal manner. According to the invention, this can be a detection of limit values by a sensor system in a wind turbine or central wind park monitoring or also central power system monitoring of the system operator or the energy supplier.

According to the invention, a suitable operating parameter is used and its change with time or rate of change is used, preferably this will be the frequency change or rate of change, using suitable limit values as a basis, e.g. 0.2 Hz in a 50 Hz system and/or 0.05 Hz/s. Depending on the stability of the power system, a sufficiently large dead zone is required in order to avoid the fault signal from being triggered too frequently which would lead to a significant loss of yield. The limit value of 0.01 Hz/s, which is desirable for a very stiff power system, can lead to the fault signal being triggered very frequently, e.g. in the case of a weak power system.

The invention can also be used for damping system frequency oscillations. For this purpose, signals are correspondingly delivered to the individual wind turbines which are output continuously over a prolonged period of time but differently from one another to the individual wind turbines. For this purpose, prognostic tools can be utilized which can predict with sufficient accuracy which primary control power will be required at which time and at which point in the power system.

In dependence on the converter and control system used in the wind turbine, it may be required to design the converter and the controller with different speed/power characteristics than were hitherto used or to provide additional margin for power feed-in for utilizing the full mechanically present potential of control energy. The total control power to be provided by a wind park can be "distributed" to the individual plants by a central network control system which in this case can also be, e.g. only a wind park control system. As an alternative, each plant can also selectively generate control signals in its own control unit which correspond to their current individual plant status.

According to the invention, a control algorithm is provided for this purpose which provides the provision of a predeterminable amount of control energy as target value for the controller. This amount can be determined in dependence on the wind energy fed in the power system (from locally in a wind turbine up to all over Europe) or also in dependence on the specifications of the energy supplier and can be subject to continuous changes. As well, the wind turbine (or the wind park) can individually determine the amount of wind energy to be provided with the aid of a predetermined algorithm from operating parameters (system voltage, system frequency, wind velocity, rotor speed etc.), possibly with the aid of prognostic methods. In practice, this can mean that a wind turbine is operated with a minimum rotor speed of 10 rpm, for example with 14 rpm although the optimum energy yield would be 12 rpm, because the predetermined amount of control energy requirement corresponds to a speed difference of 10 to 14 rpm.

According to the invention, a method for providing control power or primary control power, respectively, for an electrical energy generator and distributor system is also created which is connected to a multiplicity of power stations including wind turbines and in which the control power is derived from the kinetic energy of the rotating masses of wind turbines.

The essential factor for the present invention is that, for the primary power in special situations of a power system, an "energy source has been tapped" which has hitherto not been considered. A wind turbine operated in accordance with the invention can produce the excessively delivered power by utilizing the kinetic energy of its moving masses. This can only be done for a short time since otherwise the rotational speed would drop too far and there would be a risk of the wind turbine being switched off.

In converter-fed wind turbines, the power delivered is not directly dependent on the rotational speed. Since the generator/converter system is not designed for nominal power but certain margins are provided for short-term overloads, it is possible for a short time to feed slightly more power into the system than is permitted by the wind conditions. The energy is then taken from the rotating masses (blades, hub, drive train, generator), i.e. in accordance with the mass inertia of the rotational energy in accordance with the relation $\Delta E = \frac{1}{2} \theta (\omega_1^2 - \omega_2^2)$.

Lowering the rotational speed is thus dependent on the energy which is fed into the power system. The permissible drop in speed and thus the available energy which can be fed in must be determined by means of the plant and environmental conditions. The form in which the energy is taken off, however, can be specified in dependence on the requirements of the system operator.

Thus, energy can be delivered in proportion to the deviation of the system frequency but it is also possible to specify, e.g. a dynamic behavior which feeds in more in the case of rapid changes in frequency.

To compensate for system incidents, it is possible to specify, e.g. a threshold, e.g. when the frequency decreases at a certain rate or has dropped below a certain limit, from which the system responds.

The kinetic energy stored in the rotating masses of a wind turbine is limited. But the frequency is a quantity of a power system which can be measured in the entire power system with a short delay. Thus, wind turbines which are distant by several hundred kilometers from the location of an incident can also make a contribution to control. Due to the large number of installed wind turbines, a small contribution per wind turbine can also have a significant effect on the power system in the aggregate.

In wind parks, the control power can be allocated to individual wind turbines. The wind turbines located at the back from the point of view of wind direction can supply a greater contribution to the control power since, as a rule, they are less loaded. Information about the wind velocity of the wind turbines located further in front can be utilized for better utilization of the available limits of the system (permissible speed band in dependence on the wind velocity to be expected in the short term). Use in combination with a wind prognosis is appropriate for ensuring that, e.g. sufficient wind will be available for the next 24 hours so that the rotors of all wind turbines can rotate and supply sufficient control power.

If necessary, the speed of wind turbines can be increased at low wind velocities in order to always be above the minimum speed of the operating range.

The special characteristics of the method according to the invention are:

1. reduction of the control margin necessary for correcting for system errors in the power system
2. reduction of frequency changes in the power system (or of the control power necessary for avoiding frequency changes, respectively)
3. lesser excitation of frequency changes in the power system by the wind turbine
4. no or little losses of yield when operated as emergency reserve
5. little losses of yield in continuous use for damping frequency changes.

The essential fact of implementing the present invention is that the wind turbines can be operated in such a manner that they can respond to control signals. This means that the wind turbine is prepared for this mode and the system operator can rely on the response of the wind turbines when a fault signal occurs, so that the corresponding interactions can occur.

In the embodiment with fault signal sent by a central station, the invention is also based on a certain cooperation between the wind turbine operator and the power system operator. The power system operator must detect the faults occurring and forward them in the form of the fault signal to the wind turbine operator.

For the transmission of these fault signals, all possible transmission paths can be considered, whether line-connected or not.

The invention can be advantageously used not only for providing a control margin for compensating for active-power deficits after faults in the power system but also when it is a matter of implementing dampings of oscillations of the frequency in electrical energy distribution systems.

In a first approximation, the change in system frequency is a measure of the difference of power fed-in to power delivered. The magnitude of the necessary correcting variables is dependent on the mass inertia of the rotating masses existing in the power system. If generators with high mass inertia are placed by those having a low mass inertia in an electrical energy distribution system, the control system must respond more rapidly in order to avoid a change in system frequency. If no fast response is possible, either a greater frequency deviation must be provided or it is attempted to reduce the frequency deviation by means of a higher correcting variable. However, this frequently has the disadvantage of overshooting and thus longer settling times until the frequency is again within the desired frequency band.

To avoid a permanent deviation of the system frequency, control of the system frequency is one of the usual tasks of power stations: with a frequency above the nominal frequency, the power fed into the system is reduced and with a frequency below the nominal frequency, said power fed in is increased. As a rule, the reduction or increase in electrical power is effected by controlling the energy supply or the fuel in the power station.

Controlling the system frequency is one of the central requirements for electrical energy distribution systems. If the system frequency deviates from the nominal frequency beyond a certain threshold, loads and generators are disconnected or added step by step.

To correct the frequency changes rapidly resulting in consequence of load changes, particularly but not only due to a reduction of the available power of the generators, control energy is needed which must be available until a) the temporary power deficit occurring is compensated for again or b) it has been possible to increase the power of slow controllable generators.

As a rule, it is simpler to reduce the power of wind turbines fed in than to increase the power fed in. A temporary reduction in the power fed in below the power provided by the wind or, respectively, the usual maximum power, leads to a drop in yield for the duration of power reduction without there being a corresponding save in primary energy as is possible, e.g. in the case of thermal or hydroelectric power stations.

Methods for increasing the energy yield of a wind turbine by influencing the rotational speed are known so that the optimum operating point of the rotor blades can be reached as quickly as possible.

A usual method for regulating wind turbines is decoupling power fed in and rotational speed, e.g.

a) in order to achieve an evening out of the feed-in power, b) in order to achieve a reduction of loads, e.g. in order to reduce the fluctuations of torque when operating at a selected speed operating point for the blade pitch control, c) in order to achieve a constant or predetermined feed-in power, and d) in order to store kinetic energy in the rotor to a limited extent especially when operating with constant feed-in, in order to achieve a higher energy yield or reduced loads.

One usual method is the change in rotational speed of a wind turbine, e.g. in order to a) increase the energy yield by better aerodynamic utilization of the blades, b) achieve a reduction of loads, among other things also for avoiding the excitation of natural-frequency oscillations, c) achieve a reduction in sound emissions, and in order to d) ensure, that a wind turbine will not leave the permissible operating range even in the case of strong turbulences.

To increase the power with respect to a given operating point, a part of the available power must be kept available as reserve. As a rule, this does not lead to any or only little financial losses, e.g. in the case of thermal or hydroelectric power stations.

BRIEF DESCRIPTION OF THE DRAWINGS

In the text which follows, the invention will be explained by way of example with reference to the drawings, in which.

DESCRIPTION OF THE INVENTION

Figure 1:
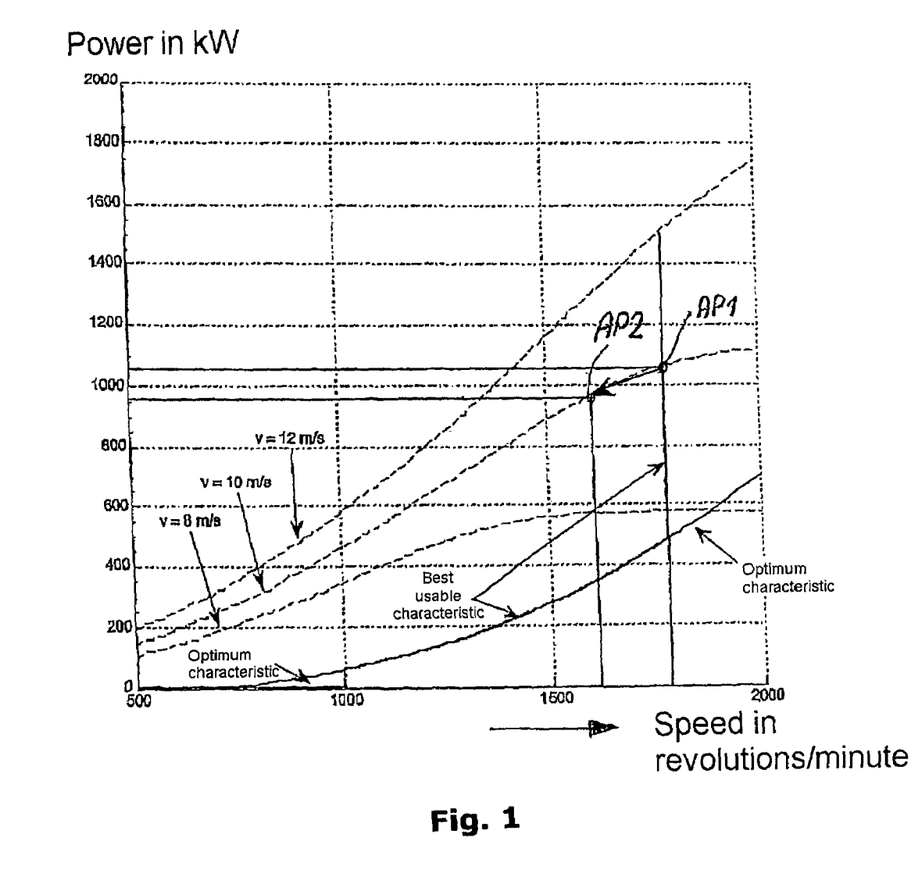
FIG. 1 shows a characteristic of a wind turbine.

The aerodynamic conditions at a wind turbine lead to there being an optimum rotational speed for each wind velocity at which the wind turbine should be operated in order to achieve the maximum yield. This is shown in FIG. 1 as power as a function of rotational speed in the example for wind velocities of 8 m/s, 10 m/s and 12 m/s. If the peaks of these individual curves are joined, the optimum characteristic for operating a wind turbine ("optimum characteristic") with a given rotor blade is obtained. In practice, the available speed range is limited (to generator speeds from 1000 to 2000 rpm in the given example) so that, in steady-state operation, only operating points on the curve labeled "best usable characteristic" are chosen which initially follows the optimum characteristic and rises up to nominal power at fixed rotational speed from the rotational speed of 1780 rpm.

If the reserve power is activated at the operating point designated by AP1 (1780 rpm, 1050 kW), the rotational speed of the wind turbine, with an assumed constant wind velocity of 10 m/s, drops to the operating point AP2 (1580 rpm, 975 kW) since (for a limited time) more power is fed into the system than can be taken up by the wind.

In the implementation of the invention (see FIG. 1) attention must be paid to the fact that the usable energy stored in the wind turbine is limited (the wind turbine must not leave the lower limit of the speed range) and that a severe reduction in speed leads to an operation at a poor operating point. With a drop by 200 rpm, the operating point shifts from AP1 to AP2. At that point, about 5% less power can be obtained from the wind with the same wind conditions with unchanged blade pitch. Dropping the speed even further may distinctly reduce the feed-in power available after the end of the additional power feed-in (after 10 seconds in this example) for a short time.

The energy yield can be optimized by changing the blade pitch in the new operating point AP2. Independently of this, a higher yield at operating points away from the nominal point can be achieved by modified blade designs in the future.

The stored energy in the rotor can be continuously monitored. As a rule, the turbine speed, the wind velocity and the possible feed-in remaining after a reduction in speed are considered. It is sufficient, however, only to monitor the current speed and, when a fault signal is present, to feed in excessive power until the rotor speed has dropped to the permissible minimal speed. If there are specifications for a minimum control energy to be kept available, the minimum speed of the wind turbine is correspondingly specified and also adhered to, wind conditions permitting. The reserve energy is activated on request (e.g. voltage dropped by more than 10% within 100 ms or fast frequency change of more than 100 mHz in 1 s or an externally transmitted signal). A power to be defined is fed into the system in addition to the energy available according to the wind turbine characteristic.

The precise variation with time of the feeding-in of the reserve energy can be effected in discretion with the system operator: short time much energy, longer time little energy or the variation can change with time, e.g. initially much and then less energy.

The amount of energy to be fed in can be directly specified or indirectly defined (e.g. via the duration or after a drop to a particular rotational speed).

After the end of the additional energy feed-in has been reached, the wind turbine returns to its old operating point. On average, only as much energy is fed in at a maximum as is available from the wind.

The following special cases can be considered:

On request, the turbine speed can be increased compared with the normal operating point in order to be able to provide additional energy for a possible fault.

Wind conditions permitting (e.g. little turbulence), this increase in turbine speed can also exceed the nominal operating point of the wind turbine.

At wind velocities above nominal wind, a 2-stage method is used
  a) on request, additional energy is firstly fed in immediately
  b) the power input of the wind turbine is increased by adjusting the blades toward the optimum operating point (wind conditions permitting) in such a manner that the turbine speed will not drop further and the original operating point is approached again.

If a wind turbine is (spatially) close to a short circuit, it may be appropriate initially to use a (large) proportion of the available current (or of the power) of the wind turbine (as reactive current or reactive power, respectively) for backing up the system voltage (e.g. until the system voltage has reached 90% of the previous voltage again). The reserve power is then only fed in after restoration of the system voltage.

The abovementioned method is useful, e.g. in order to bridge the short-term failure of feed-in power after a fault (short circuit) in the system. Wind turbines of the previous type of construction will disconnect from the system after such a fault. In the time needed by such wind turbines for connecting themselves to the system again, an additional feed-in of energy can prevent or at least reduce the drop in system frequency so that a critical situation is prevented from arising in the system.

If less power is fed into the system than is taken out by the load, the system frequency drops. As a consequence of the failure of feed-in power, e.g. after a short circuit in the system, a noticeable drop in system frequency can occur. Wind turbines distanced far from a fault location can also detect the frequency change and respond to it. If, e.g., the system frequency drops by more than 50 mHz within 1 second, additional power should be fed into the system.

If the system frequency then rises again, oscillations will occur and may make it necessary to feed in additional reserve energy, i.e. to dampen the oscillation.

Typical fluctuations of the system frequency as a consequence of inter-area oscillations are currently between 0.2 and 0.8 Hz in Europe (UCTE system). In the case given in FIG. 3 (0.22 Hz=4.5 s period), the wind turbine thus has to feed additional power into the system for 2.25 seconds and reduce the power feed-in into the system for 2.25 seconds in order to be able to dampen the oscillation.

If the rotational speed of the wind turbine changes, e.g. by no more than 50 rpm (at nominal speed), e.g. 5% of the instantaneous power could be utilized for damping natural frequencies in the system.

Conventional concepts of frequency control use a slight throttling (by adjusting the blade pitch in the case of wind turbines) in order to keep available power margins for control tasks.

By utilizing the stored energy, a reduction in the control expenditure can be achieved with minimum reduction in yield. With frequency control with 2% of the nominal power, the power can be increased again, e.g. in operation above nominal wind by adapting the blade pitch (wind turbine is already slightly throttled in order to limit the power). In this context, naturally, the design limits of the wind turbine must be observed (possibly in dependence on the current environmental conditions). Below nominal wind, more energy (with decreasing frequency) or less energy (with increasing frequency) can be fed into the system for up to 30 seconds without needing an operation with slightly throttled wind turbine (and thus distinct losses of yield).

It is known that the control power available in a power system and provided by conventional power stations can only be activated with a time delay. A usual specification is that 50% of the available primary control energy should be activated within 5 seconds and the entire primary control energy provided must be available only within 30 seconds. This presents an advantage for the invention which makes it possible to close this gap within certain limits because activation of the reserve energy of the wind turbines is possible within less than 100 ms after detection of the frequency drop.

Although the total available energy is limited, it is suitable for bridging the time until
 a) conventional power stations provide additional control power and
 b) wind turbines which have disconnected themselves from the system, e.g. due to a voltage dip, feed in power again.

As can be seen from FIG. 1, the activation of reserve energy, e.g. at a wind velocity of 8 m/s, only leads to a minimum drop in the power which can be fed in due to the aerodynamics of the rotor blades even when the rotational speed drops by 200 rpm.

The situation is different at high wind velocities. In this case, a drop in speed by 200 rpm leads to a worse operating point. The power which can be fed into the system at this operating point (AP2) is distinctly below the power which can be fed in at nominal speed (AP1). Initially, this acts like a disadvantage of the method since, after the end of the feeding-in of reserve energy, less power can be fed in than before the activation. Considered more closely, however, it is found that the wind velocity is different in time and location. If a relatively large number of wind turbines are operated in the power system, there will also be a significant number of wind turbines, in the case of a high wind velocity on average, at which the wind velocity is above the nominal wind velocity. These wind turbines are already operated throttled down, i.e. the wind conditions would allow a higher feed-in than is fed in by the wind turbines. If they are able, these wind turbines can feed more than nominal power into the system for a limited time, not only limiting the drop in speed after activation of the reserve energy by a change in blade pitch, but even correcting the speed back to its original value. The design of the wind turbine permitting, they can even feed 10% more power into the system for a longer period (e.g. for 30-60 seconds instead of only for 5 s-10 s). Thus, they can feed in, e.g. more energy until the wind turbines, which are operated at a disadvantageous operating point after the end of the reserve energy feed-in, have approached their original operating point again.

A wind turbine with 1.5 MW nominal power and 70 m rotor diameter is used as a basic example for a design in the fault case:

The mass inertia of the wind turbine is approx. 450 kgm$^2$, the nominal speed is 1780 rpm, resulting in a kinetically stored energy of 7.6 MWs.

At nominal speed, an energy of 760 kWs is then available at a drop in speed by 200 rpm. Thus, up to 163 kW power (up to 11% of the nominal power) can be additionally fed in, e.g. for 10 seconds or up to 22% of the nominal power can be additionally fed in for 5 seconds.

Figure 2:
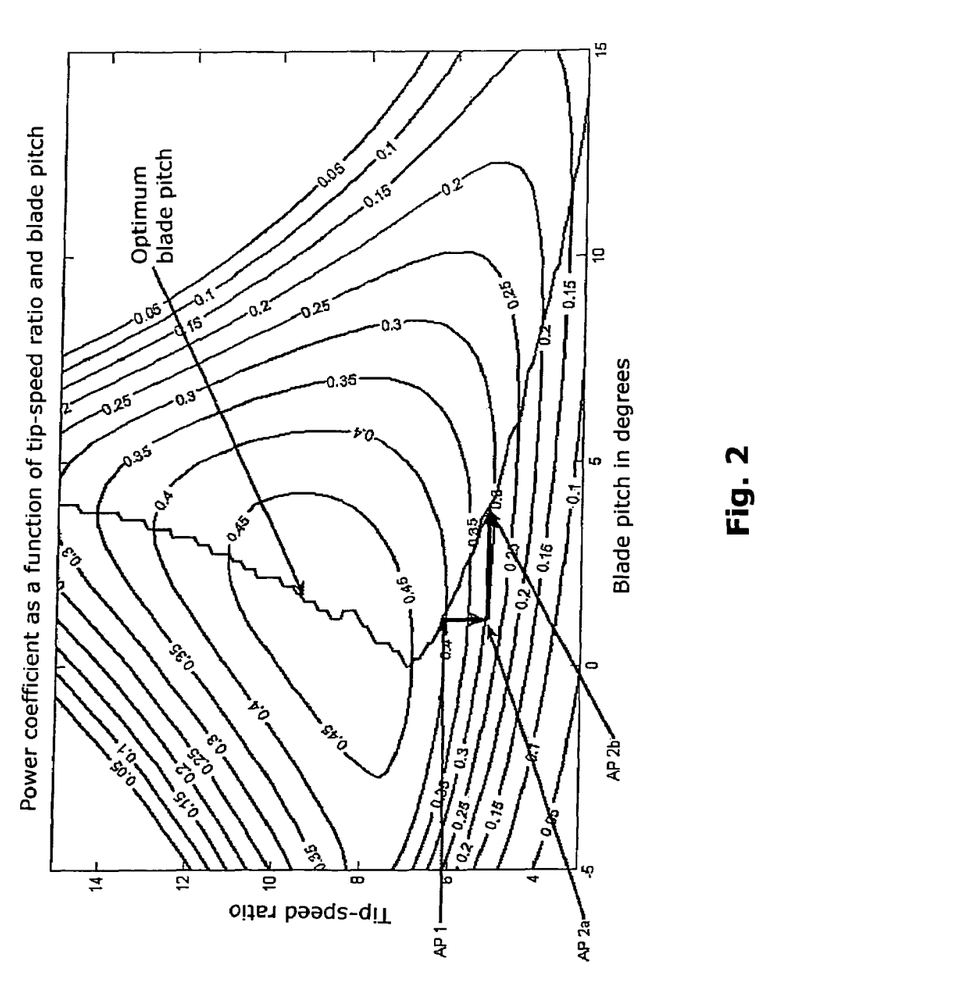
FIG. 2 shows a representation of the power coefficient with the rotor blade of a wind turbine in dependence on blade pitch and the tip-speed ratio.

FIG. 2 shows the power coefficient as a function of blade angle and tip-speed ratio, i.e. the ratio of tangential speed of the blade tip to the free stream wind velocity. The power coefficient describes the part of the energy which can be removed from the wind by means of the rotor blades. Higher values must be attempted, therefore.

Due to the drop in speed as a consequence of the activation of the reserve energy, the operating point changes from AP1 in the direction of AP2a. The power factor becomes worse and the power which can be obtained by the wind turbine from the wind drops as a result. However, the effect can be reduced by changing the blade pitch in attempting an operation at the operating point AP2b. It must be noted that there are no real steady-state operating points in the operation of a wind turbine. In reality, the operating conditions (e.g. wind velocity) continuously change so that the wind turbine is run in an operating range by dynamic control. This has been indicated by the fuzzy variation of the blade pitch in FIG. 2.

If there are specifications for a minimum energy to be kept available, the minimum speed of the wind turbine is correspondingly predetermined and also maintained, wind conditions permitting.

If the system frequency drops by more than 0.05 Hz within a second, the reserve energy is activated. The power fed into the system by the wind turbine is increased for a short time by 10% compared with the power currently available by the wind in accordance with the wind turbine characteristic.

The reserve energy is activated for a maximum of 10 seconds. If the system frequency rises again to the value of the nominal frequency in the meantime, the reserve energy feed-in is (prematurely) ended. After the additional energy feed-in has ended, the wind turbine returns to its old operating point. On average, only as much energy as is available from the wind is fed in at a maximum.

Figure 3:
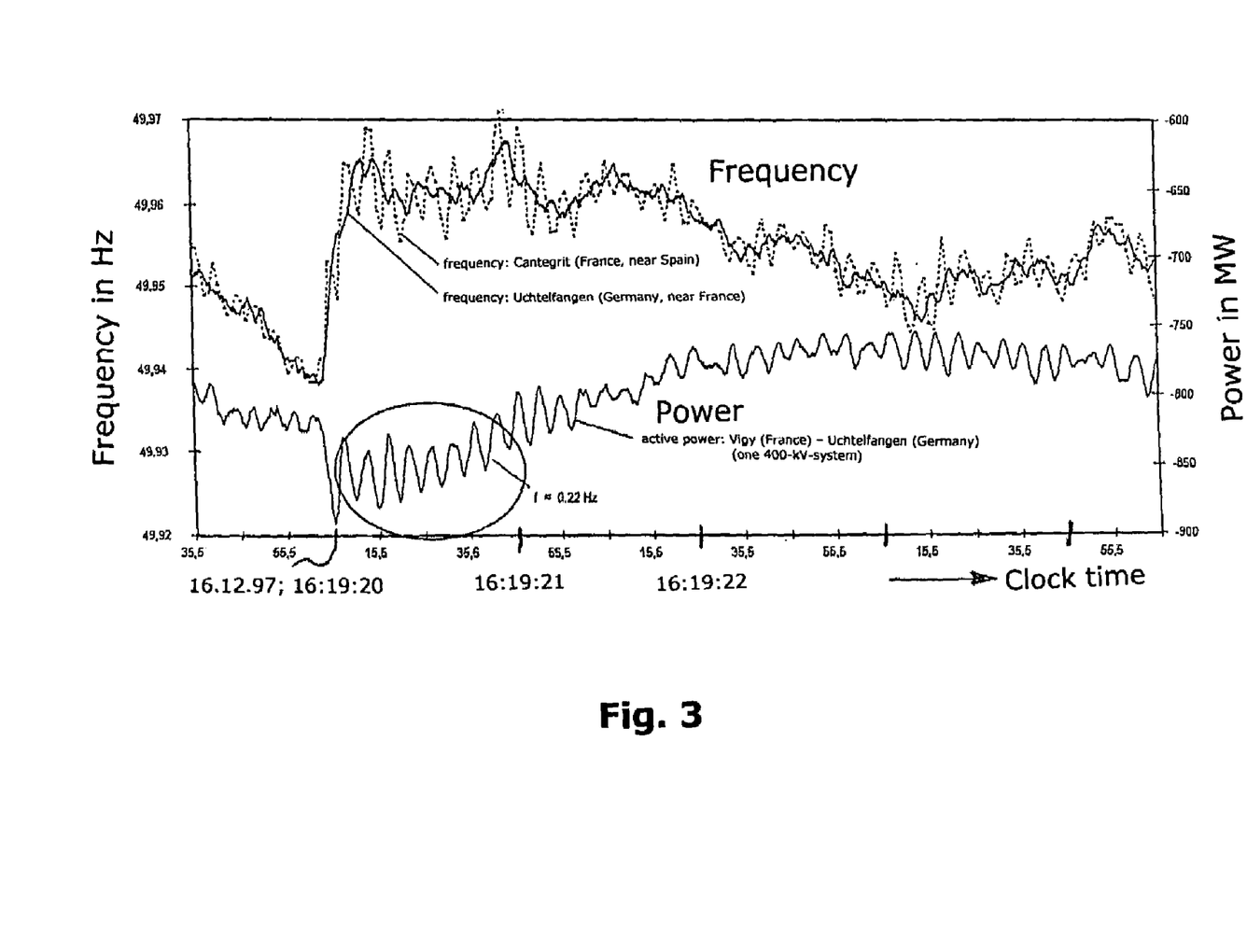
FIG. 3 shows a representation of the oscillations of the system frequency as a consequence of a load failure with respect to time.

FIG. 3 shows an example (load failure on 16 Dec. 1997 in Spain: 500 MW. Measurements of the inter-area oscillations 0.22 Hz in France and Germany) for a measured oscillation of the system frequency of the energy supply system as can be damped in accordance with the present invention. The lower curve shows the variation with time of the power (right-hand scale). The top curves show the frequencies measured at two locations (left-hand scale), in Cantegrit (France), that is to say in the vicinity of the location of the incident, and in Uchtelfangen (Germany), that is to say more distant from the location of the incident. Typical fluctuations of the system frequency due to inter-area oscillations are currently between 0.2 and 0.8 Hz in Europe (UCTE system). The amplitudes of these oscillations are less pronounced and are partially only poorly damped. Due to their periodicity, a central or decentralized system monitoring station can generate an anti-phase control signal synchronized to the oscillation, with which the control device for providing kinetic control energy is addressed. In the case specified above (0.22 Hz=4.5 s period), the wind turbine thus has to feed additional power into the system for 2.25 s and reduce the power feed-in into the system for 2.25 s in order to dampen the oscillation. Due to its periodicity, a much lower response threshold of the control method is appropriate when selecting a suitable filter as is the case in the case of a system incident. It can thus be appropriate to generate a corrective signal even at an amplitude of 0.001 Hz if the oscillation is present for a relatively long time (e.g. more than 5-10 periods).

The invention claimed is:

1. A method for operating a generating system comprising at least one wind turbine with a rotor and an electric generator coupled to the rotor for delivering electrical power into an energy distribution system with a control device which ensures that the wind turbine operates within its operating range, comprising:
   a) operating the wind turbine in a non-throttled mode that corresponds to a best usable characteristic of the wind turbine;
   b) detecting an unpredicted change in an operating parameter of the energy distribution system;
   c) reacting to the unpredicted change by feeding a higher amount of power into the energy distribution system, the higher amount of power being greater than is permitted by wind conditions by an excessive amount, the excessive amount of power being taken from the kinetic energy of the rotor; and
   d) returning to the non-throttled mode after the feeding of the excessive amount of power is completed.

2. The method of claim 1, further comprising determining a minimum rotational speed and automatically ending the feeding of the excessive amount of power when the minimum speed is reached.

3. The method of claim 2, the reacting to the unpredicted change occurs in response to an occurrence of a limit value or fault signal, and wherein the limit value or fault signal is generated either locally at the wind turbine or at a distance from the wind turbine in the energy distribution system.

4. The method of claim 1 or 2, wherein a multiplicity of wind turbines is driven by a multiplicity of different signals and wherein the different signals can be generated by a central system control.

5. The method of claim 1 or 2, wherein a system frequency, a system voltage or a rate of change of the system frequency or system voltage is used as the system operating parameter.

6. The method of claim 1 or 2, wherein the the reacting to the unpredicted change occurs in response to at a frequency drop within a range of below 0.2 Hz or with a decrease of above approx. 0.05 Hz in 1 second.

7. The method of claim 1 or 2, comprising selecting a time of approx. 0.05 to 60 seconds as a period of time during which the higher power is fed into the energy distribution system.

8. The method of claim 1 or 2, further comprising continuously delivering the signals to the wind turbines on the basis of measurements, statistics or empirical data.

9. The method of claim 1 or 2, comprising, when the speed is reduced by increased power delivery, correcting the blade pitch angle in such a manner to enable optimum power to be taken from the wind for the prevailing wind and speed conditions.

* * * * *

UNITED STATES PATENT AND TRADEMARK OFFICE
CERTIFICATE OF CORRECTION

| | | |
|---|---|---|
| PATENT NO. | : 7,528,496 B2 | Page 1 of 1 |
| APPLICATION NO. | : 10/570196 | |
| DATED | : May 5, 2009 | |
| INVENTOR(S) | : Jens Fortmann | |

It is certified that error appears in the above-identified patent and that said Letters Patent is hereby corrected as shown below:

On the Title Page

Item (30), "Foreign Application Priority Data," please replace "103 41 057" with --103 41 057.0--.

Item (30), "Foreign Application Priority Data," please replace "103 41 504" with --103 41 504.1--.

Signed and Sealed this

First Day of September, 2009

David J. Kappos
*Director of the United States Patent and Trademark Office*